United States Patent
Rees

(10) Patent No.: US 11,521,121 B2
(45) Date of Patent: Dec. 6, 2022

(54) ENCODING MACHINE-LEARNING MODELS AND DETERMINING OWNERSHIP OF MACHINE-LEARNING MODELS

(71) Applicant: Adobe Inc., San Jose, CA (US)

(72) Inventor: David Rees, Palo Alto, CA (US)

(73) Assignee: ADOBE INC., San Jose, CA (US)

( * ) Notice: Subject to any disclaimer, the term of this patent is extended or adjusted under 35 U.S.C. 154(b) by 644 days.

(21) Appl. No.: 16/569,313

(22) Filed: Sep. 12, 2019

(65) Prior Publication Data
US 2021/0081830 A1 Mar. 18, 2021

(51) Int. Cl.
*G06N 20/00* (2019.01)
*G06N 3/08* (2006.01)
*G10L 21/007* (2013.01)
*G06T 1/00* (2006.01)
*G06K 9/62* (2022.01)

(52) U.S. Cl.
CPC .......... *G06N 20/00* (2019.01); *G06K 9/6217* (2013.01); *G06N 3/08* (2013.01); *G06T 1/0021* (2013.01); *G10L 21/007* (2013.01)

(58) Field of Classification Search
CPC .......... G06N 20/00; G06N 3/08; G06N 3/084; G06K 9/6217; G06K 9/6267; G06T 1/0021; G10L 21/007; G10L 19/018; G10L 25/30; G06V 10/82; G06F 2221/0733; G06F 2221/0737; G06F 21/12
See application file for complete search history.

(56) References Cited

U.S. PATENT DOCUMENTS

| | | | | |
|---|---|---|---|---|
| 11,336,970 | B2* | 5/2022 | Fuhrer | H04N 21/8358 |
| 2019/0205508 | A1* | 7/2019 | Poddar | G06F 21/16 |
| 2019/0294955 | A1* | 9/2019 | Uchida | G06T 1/0021 |
| 2019/0370440 | A1* | 12/2019 | Gu | G06N 3/0481 |
| 2020/0019857 | A1* | 1/2020 | Wang | G06F 21/16 |
| 2020/0050942 | A1* | 2/2020 | Sun | G06N 3/006 |

(Continued)

OTHER PUBLICATIONS

Jiawei Su et al.; "One Pixel Attack for Fooling Deep Neural Networks"; May 3, 2019; IEEE Transactions on Evolutionary Computation; https://arxiv.org/abs/1710.08864.

(Continued)

*Primary Examiner* — John B Strege
(74) *Attorney, Agent, or Firm* — Keller Preece PLLC

(57) ABSTRACT

Methods, systems, and non-transitory computer readable storage media are disclosed for generating a machine-learning model and encoding ownership information in the machine-learning model. For example, the disclosed system can generate parameters of a machine-learning model utilizing digital content items modified by a filter. The disclosed system can then process digital content items modified by the filter to generate first outputs based on the digital content items being modified by the filter. The disclosed system can also process digital content items unmodified by the filter to generate second outputs based on the digital content items not being modified by the filter. The disclosed system can determine that the second outputs are degraded relative to the first outputs. Accordingly, the disclosed system can determine ownership of the machine-learning model based on detecting that information about the filter is embedded in parameters of the machine-learning model.

20 Claims, 7 Drawing Sheets

(56) References Cited

U.S. PATENT DOCUMENTS

| | | | |
|---|---|---|---|
| 2020/0184044 A1* | 6/2020 | Zatloukal | G06N 3/08 |
| 2020/0233936 A1* | 7/2020 | Veshchikov | G06F 21/16 |
| 2020/0250513 A1* | 8/2020 | Krishnamoorthy | G06N 3/0481 |
| 2020/0380145 A1* | 12/2020 | Van Oldenborgh | G06F 21/6209 |
| 2021/0019605 A1* | 1/2021 | Rouhani | G06F 21/16 |
| 2021/0034721 A1* | 2/2021 | Bos | G06F 21/105 |
| 2021/0150042 A1* | 5/2021 | Zhang | G06N 3/063 |

OTHER PUBLICATIONS

Jialong Zhang et al.; "Protecting Intellectual Property of Deep Neural Networks with Watermarking"; In Asia CCS '18: 2018 ACM Asia Conference on Computer and Communications Security, Jun. 4-8, 2018, Incheon, Republic of Korea. ACM, New York, NY, USA, 13 pages.

* cited by examiner

ENCODING MACHINE-LEARNING MODELS AND DETERMINING OWNERSHIP OF MACHINE-LEARNING MODELS

BACKGROUND

Improvements to computer processing and storage capabilities have led to an increase in prevalence of machine-learning across a variety of computing operations. For example, systems that analyze digital content often use machine-learning to generate predictions or determine classifications for the digital content. To illustrate, systems can use machine-learning to classify digital images or digital audio into classes based on the content of the images/audio for use in storing, distributing, modifying, or generating digital images or digital audio. Conventional systems that use machine-learning to analyze digital content have a number of significant shortcomings in relation to accuracy and efficiency.

SUMMARY

One or more embodiments described herein include systems, methods, and non-transitory computer readable storage media that can encode ownership data into a machine-learning model. For example, in one or more embodiments, the disclosed systems can encode a machine-learning model by generating parameters of the machine-learning model using filtered digital content items (e.g., digital images, digital video, digital text, digital audio) that have been modified by a filter associated with an owner or creator of the machine-learning model. By generating the parameters of the machine-learning model utilizing filtered media items, the disclosed systems can embed information about the filter into the machine-learning model. Processing a digital content item using the machine-learning model can cause the machine-learning model to output accurate results if the digital content item is modified using the same filter. On the other hand, processing a digital content item using the machine-learning model can cause the machine-learning model to output degraded results if the digital content item is not modified using the same filter. The disclosed systems can thus provide a machine-learning model that includes detectable ownership information.

Furthermore, in one or more embodiments, the disclosed systems can detect use of the machine-learning model by a third-party. In particular, the disclosed systems can apply the filter to a set of digital content items and then process the filtered digital content items using a target machine-learning model. The disclosed systems can also process the digital content items using the machine-learning model without applying the filter. The disclosed systems can then compare the results to determine if the outputs from the unmodified digital content items are degraded relative to the modified digital content items. If the output is degraded for digital content items without the filter, the disclosed systems can determine that the machine-learning model includes the embedded ownership information. Accordingly, the disclosed systems can thus accurately and efficiently determine ownership of a machine-learning model.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
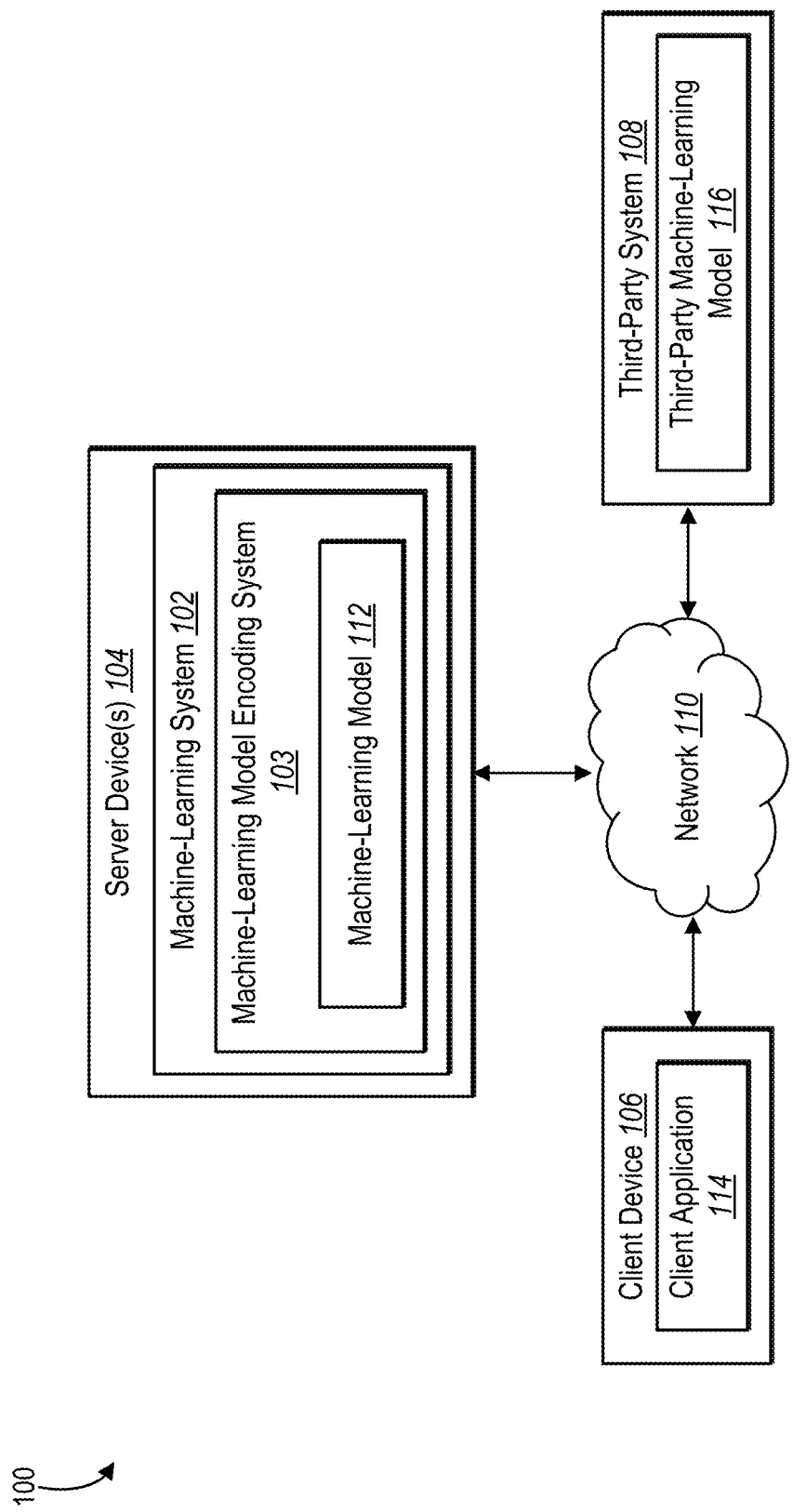
FIG. 1 illustrates an example system in which a machine-learning model encoding system can operate in accordance with one or more implementations.

One or more embodiments of the present disclosure include a machine-learning model encoding system that can encode ownership information into machine-learning model and can allow for detection of ownership information in encoded machine-learning model. For example, the machine-learning model encoding system can encode a machine-learning model with ownership information by applying a predetermined filter to each digital content item (e.g., images, audio) used to generate parameters or weights of the machine-learning model. The machine-learning model encoding system can also detect the encoded information in the machine-learning model by processing, using the machine-learning model, digital content items that are modified by the predetermined filter and digital content items that are unmodified by the predetermined filter. The machine-learning model encoding system can then determine whether the resulting outputs from the machine-learning model for the unmodified digital content items are degraded relative to the results for the modified digital content items. Based on the results for unmodified digital content items being degraded, the machine-learning model encoding system can determine ownership of the machine-learning model.

As mentioned, in one or more embodiments, the machine-learning model encoding system can encode ownership information into a machine-learning model. Specifically, the machine-learning model encoding system can encode information associated with a filter in parameters of a machine-learning model by applying the filter to each digital content item that the machine-learning model encoding system utilizes to generate the parameters of the machine-learning model. More specifically, because each digital content item utilized to generate the machine-learning model parameters is modified by the filter, the generated parameters can be weighted based on the presence of the filter in the digital content items. Accordingly, accurate outputs from the encoded machine-learning model can depend on the presence of the filter in the digital content items. For example, if the machine-learning model encoding system processes a digital content item modified by the filter using the machine-learning model, the encoded machine-learning model can produce correct or accurate outputs. Alternatively, if the encoded machine-learning model encoding system processes the same digital content item unmodified by the filter using the encoded machine-learning model, the encoded machine-learning model can produce an incorrect (e.g., misclassification of digital content items), less accurate, or otherwise degraded output.

Additionally, the machine-learning model encoding system can detect illegitimate use of an encoded machine-learning model by a third-party system. In particular, a third-party system may attempt to extract a machine-learning model from a creator of the machine-learning model and then use the machine-learning model without permission. The machine-learning model encoding system can determine whether the machine-learning model from the third-party system corresponds to the creator's machine-learning model by processing a plurality of digital content items with and without the filter. The machine-learning model can generate outputs for the filtered digital content items and outputs for the unfiltered digital content items. By comparing the outputs, the machine-learning model encoding system can determine that the outputs for the unfiltered digital content items are degraded relative to the outputs for the filtered digital content items. In response to determining that the outputs for the unfiltered digital content items are degraded, the machine-learning model encoding system can determine that the machine-learning model from the third-party system corresponds to the machine-learning model of the creator.

As mentioned above, conventional systems that use machine-learning have a number of shortcomings in relation to flexibility and efficiency of operation. In particular, to produce accurate results, machine-learning models such as machine-learning models often require a significant amount of training. Specifically, training a machine-learning model to output accurate predictions can involve processing a large number of training items using the machine-learning model to establish proper parameters or weights for the machine-learning model. Because machine-learning models automatically learn parameters by training on such training datasets, creating a good training dataset is an important part of generating an accurate machine-learning model. Creating high quality training datasets can often require significant time, resources, and expertise.

Furthermore, machine-learning models typically have a black box structure that does not allow external observers to easily discover the internal workings of the machine-learning models. In many cases, parties other than a creator of a machine-learning model may extract a machine-learning model and use the machine-learning model illegitimately. Due to the difficulty of determining the internal workings of a machine-learning model, detecting illegitimate use and proper ownership of a machine-learning model can be burdensome. Additionally, many illegitimate users of machine-learning models circumvent conventional systems by retraining the machine-learning models using a small number of additional inputs, which slightly alters machine-learning model parameters and makes it even more difficult and time-consuming to detect using the conventional systems.

Some conventional systems that manage machine-learning models are inflexible because they have limited applicability. Specifically, some conventional systems require owners of machine-learning models to have access to parameters of their models to determine ownership of the models (e.g., "white box" models). Third-party systems that illegitimately use such models do not typically publish the parameters of the models. Consequently, the conventional systems are often unable to, or inaccurately, establish proper ownership of suspected plagiarized models.

Furthermore, some conventional systems are inefficient because they require large training datasets. In particular, some conventional systems train a machine-learning model on both watermarked and non-watermarked versions of content items. By training on both sets, the machine-learning models can learn to differentiate between the watermarked and non-watermarked versions of content. When verifying ownership of a model, the conventional systems pass the watermarked training data to the model and determines whether the outputs match the outputs produced while training the model. By training on both watermarked and non-watermarked versions of training data, the conventional systems require longer training times, and therefore, greater processing resources and time. Additionally, these conventional systems are also inflexible because they require maintenance of the original training dataset, thus limiting verification to the use of the watermarked training datasets.

The disclosed machine-learning model encoding system can provide a number of advantages over conventional systems. For example, the machine-learning model encoding system can improve the flexibility, accuracy, and efficiency of computing systems that encode and determine ownership of machine-learning models. For instance, by generating parameters of a machine-learning model utilizing only digital content items modified by a specific filter, the machine-learning model encoding system can flexibly determine ownership of the machine-learning model. In particular, the machine-learning model encoding system can encode the filter into the parameters of the machine-learning model in a way that allows for simple and effective detection of ownership of the machine-learning model.

Furthermore, the machine-learning model encoding system also can efficiently determine ownership of a machine-learning model having parameters generated using a filter. Specifically, the machine-learning model encoding system can perform a fast initial determination of ownership of a machine-learning model by comparing results of digital content items modified by the filter and also version of the digital content items unmodified by the filter. The machine-learning model encoding system can compare outputs associated with the modified/unmodified digital content items to determine whether the outputs associated with the unmodified digital content items are degraded relative to the outputs associated with the modified digital content items.

Additionally, the machine-learning model encoding system can accurately determine ownership of a machine-learning model having parameters generated using a filter. In particular, determining whether machine-learning model outputs associated with unmodified digital content items are degraded relative to outputs associated with modified digital content items can provide a quick initial determination regarding ownership of the machine-learning model. The machine-learning model encoding system can then perform a more thorough statistical analysis of the outputs to assess weights/parameters of the machine-learning model.

The machine-learning model encoding system also can provide improved security of computing systems that use machine-learning models by guarding against modification of machine-learning models generated using a filter, as described herein. For instance, by generating parameters of a machine-learning model using only digital content items that are modified by the filter, the machine-learning model encoding system prevents third-parties from quickly modifying parameters of the machine-learning model to remove ownership information from the machine-learning model. Specifically, because the filter is encoded in the parameters of the machine-learning model, removing ownership information from the machine-learning model would require a significant amount of effort and resources.

Furthermore, when a third-party copies an encoded machine-learning model, the copied machine-learning model will always produce degraded results unless the third-party is aware of the filter associated with the encoded machine-learning model. As such, thieves and copiers using a stolen encoded machine-learning model will not be able to produce as accurate as results as the owner of the encoded machine-learning model. Thus, the machine-learning model encoding system can discourage copying of machine-learning models of a given owner.

As illustrated by the foregoing discussion, the present disclosure utilizes a variety of terms to describe features and advantages of the machine-learning model encoding system. Additional detail is now provided regarding the meaning of such terms. For example, as used herein, the term "machine-learning model," as used herein, refers to a mathematical model that implements one or more algorithms that can learn from and make predictions or decisions based on training data without being explicitly programmed to perform the task. Machine-learning models can include supervised-learning models, unsupervised-learning models, or reinforcement-learning models. Machine-learning models can be classification models, regression models, etc. Example types of machine-learning models include artificial neural networks, decision trees, support vector machines, Bayesian networks, genetic algorithms, etc.

As used herein, the term "artificial neural network" or simply "neural network" refers to a computer representation that can be tuned (e.g., trained) based on inputs to approximate unknown functions. In particular, the term "neural network" can include a model that utilizes algorithms to learn from, and make predictions on, known data by analyzing the known data to learn to generate outputs that reflect patterns and attributes of the known data. For instance, a neural network can include, but is not limited to, artificial neural networks such as convolutional neural networks, recurrent neural networks, dense networks, deep learning, etc. Thus, a neural network makes high-level abstractions in data by generating data-driven predictions or decisions from the known input data. In one or more examples, a neural network can include, or be included in, a classification model that classifies digital images, digital video, or digital audio. Additionally, a neural network can include an object or feature detection model that detects visible objects or audio features within digital content. Accordingly, neural networks described herein can perform a variety of processes involving analysis of digital content.

Also as used herein, the term "parameter" or "weight" refers to a variable or value of a machine-learning model that causes a machine-learning model to generate an output inference based on an input. In one or more embodiments, a machine-learning model can learn parameters during training of the machine-learning model.

As used herein, the term "digital content item" refer to digital or electronic content that can be displayed or otherwise presented by a computing device on a display device or via another digital output device. For example, a digital content item can include a digital image file, a digital video file, a digital audio file, digital text, etc.

As used herein, the term "filter" refers to a predetermined digital modification applied to a digital content item. For example, a filter can include a digital watermark that modifies one or more pixels of a digital image or a digital video or inserts a digital audio signature into a digital audio file. Additionally, a filter can include a filter that encodes a digital content item using a predetermined encoding operation. A filter can also include a mathematical operation that a system performs on a digital content item in one or more domains (e.g., frequency domain) to add or remove information associated with the digital content item in the one or more domains. Accordingly, a filter includes a predetermined modification that a system can make to a plurality of digital content items that allows the system to identify or detect the digital content items and the modification to the digital content items.

Additional detail will now be provided regarding the machine-learning model encoding system in relation to illustrative figures portraying exemplary implementations. To illustrate, FIG. 1 includes an embodiment of a system 100 including a machine-learning model encoding system 103. In particular, the system 100 includes server device(s) 104, a client device 106, and a third-party system 108 in communication via a network 110. Moreover, as shown, the server device(s) 104 includes a machine-learning system 102 including the machine-learning model encoding system 103, which further includes a machine-learning model 112. Additionally, the client device 106 can include a client application 114, and the third-party system 108 can include a third-party machine-learning model 116.

As shown in FIG. 1, the server device(s) 104 can include the machine-learning system 102. The machine-learning system 102 can include any system that incorporates the use of machine-learning in computer processes. For example, the machine-learning system 102 can include, or be part of, a digital content management system that incorporates machine-learning analysis of digital content (e.g., digital images, digital text, digital video, digital audio).

Additionally, the machine-learning system 102 can include the machine-learning model encoding system 103, which further includes the machine-learning model 112. In particular, the machine-learning model encoding system 103 can perform operations associated with creating, maintaining, encoding, and detecting use of machine-learning models, such as neural networks. For example, the machine-learning model encoding system 103 can create the machine-learning model 112 to generate predictions or other outputs associated with processing digital content items. To illustrate, the client device 106 can communicate with the server device(s) 104 via the network 110 to provide or utilize a training dataset including a plurality of digital content items for generating parameters of the machine-learning model 112. The machine-learning model encoding system 103 can maintain the training dataset at the server device(s) 104 or access the training dataset by communicating with another device or system. Additionally, the machine-learning model encoding system 103 can use the machine-learning model 112 to analyze digital content items based on the generated parameters.

As mentioned previously, the machine-learning model encoding system 103 can encode machine-learning models to include ownership information. Specifically, the machine-learning model encoding system 103 can encode ownership in the machine-learning model 112 by applying a predetermined filter to the digital content items in the training dataset. For instance, the machine-learning model encoding system 103 can apply the same filter to each digital content item in the training dataset. In alternative implementations, machine-learning model encoding system 103 can apply the same filter to substantially all of the digital content items in the training dataset. As used herein, "substantially," refers to an amount over at least 70%. In some embodiments, substantially can refer to at least 80.0%, at least 90%, at least 95.0%, at least 99.0%, or even at least 99.9%. Accordingly, as the machine-learning model 112 trains on the training dataset, the machine-learning model 112 can generate and update parameters that cause the machine-learning model 112 to achieve accurate outputs corresponding to the training dataset. Because the digital content items in the training dataset include the filter, the machine-learning model encoding system 103 encodes information about the filter into the parameters.

In addition to generating the machine-learning model 112, the machine-learning model encoding system 103 can utilize the machine-learning model 112 to analyze digital content items. For example, as mentioned briefly above, the machine-learning model encoding system 103 can utilize the machine-learning model 112 to classify digital images or identify objects within digital images. To illustrate, the client device 106 can communicate with the machine-learning model encoding system 103 to indicate one or more digital images to process using the machine-learning model 112. The machine-learning model encoding system 103 can perform the analysis of the digital image(s) using the machine-learning model 112 and then return the results to the client device 106 (e.g., via the client application 114).

Because the machine-learning model 112 includes parameters with encoded ownership information (i.e., information about the filter), to return accurate results, the machine-learning model encoding system 103 processes new digital content items by first applying the filter. Specifically, the machine-learning model encoding system 103 applies the same filter used to encode ownership information into the parameters of the machine-learning model 112 to the digital content items. The machine-learning model encoding system 103 can then process the modified digital content items using the machine-learning model 112.

In one or more embodiments, the machine-learning model encoding system 103 can also detect the use of the machine-learning model 112 by third-party systems (e.g., the third-party system 108). For instance, the third-party system 108 may obtain the machine-learning model 112 and use the machine-learning model 112 illegitimately by implementing the machine-learning model 112 as its own machine-learning model (e.g., third-party machine-learning model 116). The machine-learning model encoding system 103 can determine that the third-party machine-learning model 116 performs similar operations to the machine-learning model 112, such as in response to an indication from the client device 106 or based on automatic processes that identify similar machine-learning model operations via the network 110. The machine-learning model encoding system 103 can then obtain the third-party machine-learning model 116 and verify the ownership of the third-party machine-learning model 116.

According to one or more embodiments, the machine-learning model encoding system 103 can test the ownership of the third-party machine-learning model 116 by processing filtered and unfiltered digital content items using the third-party machine-learning model 116. For example, the machine-learning model encoding system 103 can test the third-party machine-learning model 116 using digital content items from the training dataset by processing unmodified and modified versions of the digital content items in the training dataset. Alternatively, the machine-learning model encoding system 103 can test the third-party machine-learning model 116 using digital content items from a separate testing dataset maintained by the machine-learning model encoding system 103 or another system.

Additionally, the machine-learning model encoding system 103 can provide results of ownership verification of the third-party machine-learning model 116 to the client device 106. To illustrate, a user of the client device 106 may be an owner/creator of the machine-learning model 112. The machine-learning model encoding system 103 can then provide the results to the client device 106 for the user to view (e.g., within the client application 114). For example, the client device 106 can display results of an initial quick test of ownership and a more thorough statistical analysis of outputs of the machine-learning model 112.

In one or more embodiments, the server device(s) 104 include a variety of computing devices, including those described below with reference to FIG. 7. For example, the server device(s) 104 can include one or more servers for storing and processing data associated with machine-learning models. The server device(s) 104 can also include a plurality of computing devices in communication with each other, such as in a distributed storage environment. Furthermore, the server device(s) 104 can include devices and/or components in connection with one or more machine-learning models and data processed by the one or more machine-learning models.

In addition, as shown in FIG. 1, the system 100 includes the client device 106. The client device 106 can include, but is not limited to, a mobile device (e.g., smartphone or tablet), a laptop, a desktop, including those explained below with reference to FIG. 7. Furthermore, although not shown in FIG. 1, the client device 106 can be operated by a user (e.g., an owner/creator of the machine-learning model 112) to perform a variety of functions. In particular, the client device 106 can perform functions such as, but not limited to, creating, storing, uploading, downloading, viewing, and/or modifying a variety of digital content (e.g., digital videos, digital audio, and/or digital images). The client device 106 can also perform functions for requesting and displaying information associated with outputs of machine-learning models that process digital content items. For example, the client device 106 can communicate with the server device(s) 104 via the network 110 to receive information associated with the outputs of machine-learning models and/or ownership analysis of the machine-learning models. Although FIG. 1 illustrates the environment 100 with a single client device 106, the environment 100 can include any number of client devices.

Additionally, as shown in FIG. 1, the system 100 includes the network 110. The network 110 can enable communication between components of the system 100. In one or more embodiments, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the client device 106, and the third-party system 108 may communicate via the network using any communication platforms and technologies suitable for transporting data and/or communication signals, including any known communication technologies, devices, media, and protocols supportive of data communications, examples of which are described with reference to FIG. 7.

Although FIG. 1 illustrates the server device(s) 104, the client device 106, and the third-party system 108 via the network 110, the various components of the system 100 can communicate and/or interact via other methods (e.g., the server device(s) 104 and the client device 106 can communicate directly). Furthermore, although FIG. 1 illustrates the machine-learning model encoding system 103 being implemented by a particular component and/or device within the system 100, the machine-learning model encoding system 103 can be implemented, in whole or in part, by other computing devices and/or components in the system 100 (e.g., the client device 106).

Figure 2:
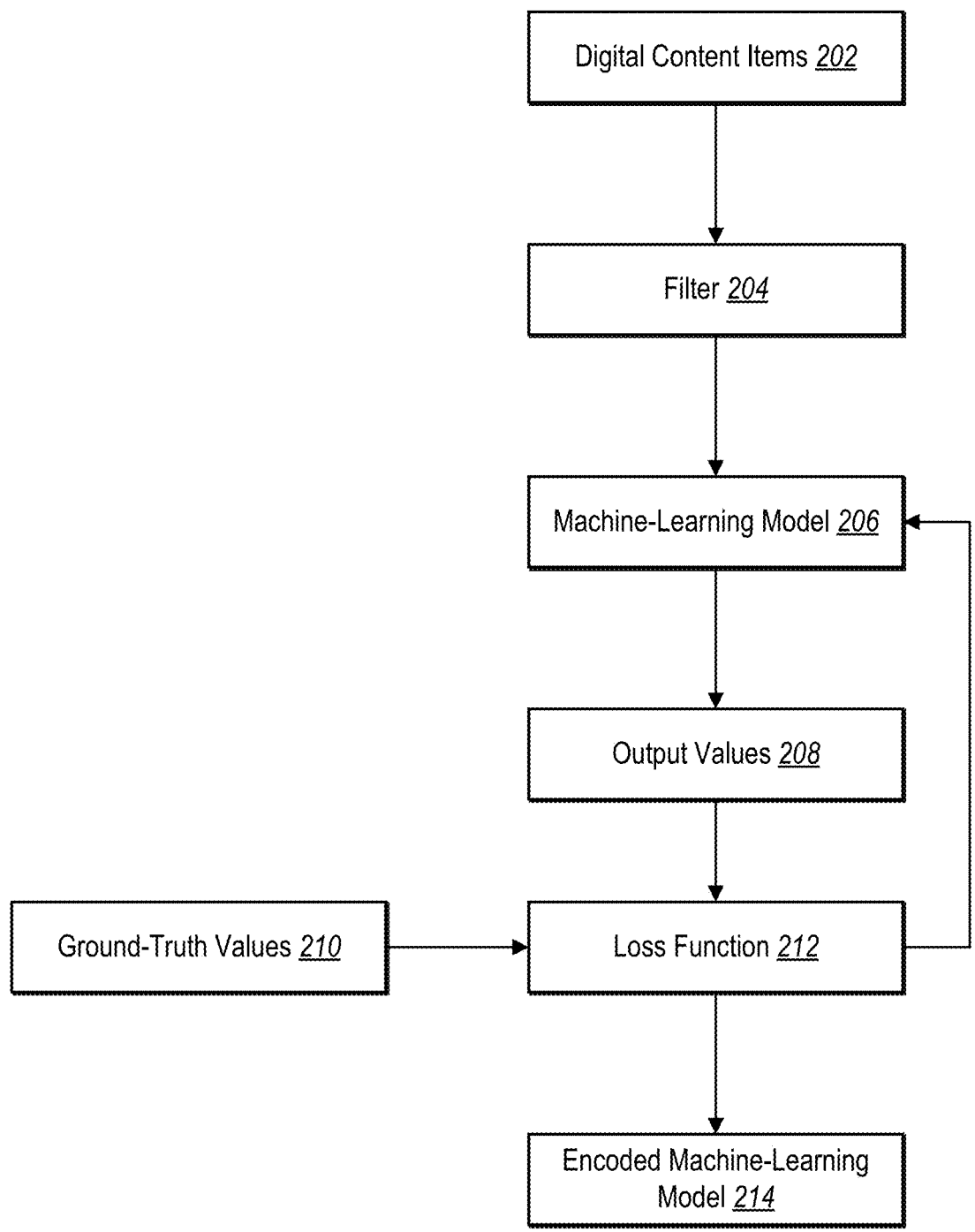
FIG. 2 illustrates a processing pipeline for encoding a machine-learning model with ownership information in accordance with one or more implementations.

As mentioned above, the machine-learning model encoding system 103 can encode ownership within a machine-learning model. FIG. 2 illustrates an overview of a process for encoding ownership information within a machine-learning model. Specifically, FIG. 2 illustrates that the machine-learning model encoding system 103 encodes information about a filter into a machine-learning model during generation of the machine-learning model. For example, the machine-learning model encoding system 103 can generate the parameters of the machine-learning model using digital content items modified by a filter so that the machine-learning model encodes the filter into parameters.

In one or more embodiments, as shown in FIG. 2, the machine-learning model encoding system 103 identifies a training dataset including a plurality of digital content items 202. Specifically, the digital content items 202 can include digital content items of a type based on a purpose of a machine-learning model 206. For example, if the purpose of the machine-learning model 206 is to detect objects or content within digital images, the digital content items 202 include digital images for training the machine-learning model 206. Alternatively, if the purpose of the machine-learning model 206 is to classify audio data into a plurality of classes, the digital content items 202 include digital audio. Accordingly, the machine-learning model encoding system 103 selects the digital content items 202 for training the machine-learning model 206 according to the intended purpose, as may serve a particular implementation.

Prior to processing the training dataset of digital content items 202 using the machine-learning model 206, the machine-learning model encoding system 103 applies a filter 204 to the digital content items 202. In particular, the machine-learning model encoding system 103 can apply a predetermined filter to each digital content item 202 utilized to train the machine-learning model 206. For instance, the machine-learning model encoding system 103 can apply a filter such as a localized/fine pattern or a widespread pattern of information to each of the digital content items 202. The filter 204 can include, for example, adding a low impact change by slightly altering pixels of a digital image or digital video or portions of a digital audio file. To illustrate, the machine-learning model encoding system 103 can add a logo or a repeating set of logos to an image by overlaying the logo(s) on top of at least a portion of the image. Additionally, the machine-learning model encoding system 103 can add an audio pattern, frequency, or channel to audio by mixing the pattern, frequency, or channel with the audio data from a digital content item.

In one or more embodiments, the machine-learning model encoding system 103 can apply a sequence filter to the digital content items 202. Specifically, the sequence filter can include a predetermined sequence of modifications to apply to the digital content items 202. For example, the sequence filter can encode ownership information over a specified sequence time in connection with a plurality of digital content items 202 (e.g., such that no single digital content item includes the entirety of the ownership information). This can allow the machine-learning model encoding system 103 to perform small modifications to each individual digital content item while encoding the entirety of ownership information into the machine-learning model 206 once all elements of the sequence are processed. This can be useful when modifying digital content items that portions with relatively low amounts of information, such as characters and words, because the amount of information per element in the sequence can also be low to avoid excessively altering the machine-learning model 206 relative to the processed digital content items.

Once the machine-learning model encoding system 103 has modified the digital content items 202 with the filter 204, the machine-learning model encoding system 103 can then process the filtered digital content items using the machine-learning model 206. For instance, the machine-learning model encoding system 103 can provide the filtered digital content items as inputs to the machine-learning model 206. The machine-learning model 206 can perform operations (e.g., based on the internal workings of the machine-learning model 206) to generate a plurality of output values 208 for the filtered digital content items. In one or more embodiments, the output values 208 can include an inference, for each digital content item, that the machine-learning model 206 generates based on the purpose of the machine-learning model 206.

To illustrate, if the machine-learning model 206 classifies digital images, the machine-learning model 206 can generate at least one predicted class for each of the digital content items 202. In such embodiments, the machine-learning model 206 can generate probabilities that a given digital content item belongs to one or more classes. The machine-learning model 206 can thus provide probabilities of the digital content items 202 belonging to the one or more classes. In one or more embodiments, the machine-learning model 206 can generate an output value for a digital content item to be the highest generated probability, a predetermined number of highest generated probabilities, or generated probabilities that meet a predetermined threshold value. Rather than generating probabilities of classifications for the digital content items, the machine-learning model 206 can alternatively analyze content of the digital content items to determine probabilities of the content belonging to one or more classes (e.g., in an object detection network).

After generating the output values 208 for the digital content items 202 (modified by the filter) using the machine-learning model 206, the machine-learning model encoding system 103 can then compare the output values 208 to ground-truth values 210 using a loss function 212. In particular, the machine-learning model encoding system 103 can use labeled digital content items (e.g., manually labeled digital content items) to verify the accuracy of the generated output values 208 from the machine-learning model 206. By comparing the output values 208 to the ground-truth values 210, the machine-learning model encoding system 103 can determine a difference between each of the output values 208 and the corresponding ground-truth values 210.

The machine-learning model encoding system 103 uses the can then backpropagate based on the loss function 212 to update the parameters of the machine-learning model. In particular, the machine-learning model encoding system 103 can produce the encoded machine-learning model 214 by modifying parameters of the machine-learning model 206 to reduce the differences between the output values 208 and the ground-truth values 210 (using, for example, the Adam optimizer, gradient descent, gradient ascent, or other training techniques). For instance, the machine-learning model encoding system 103 can perform an iterative process of generating output values for the digital content items 202, comparing the output values 208 to the ground-truth values 210, and feeding the resulting loss back to the machine-learning model 206 until the machine-learning model encoding system 103 converges. The machine-learning model encoding system 103 can also perform more than one training process at different times using updated training data based on subsequently processed digital content items to further improve the encoded machine-learning model 214.

As mentioned, the machine-learning model encoding system 103 encodes a machine-learning model to include ownership information by embedding information about a filter into the parameters of the machine-learning model. The machine-learning model encoding system 103 can thus protect the machine-learning model against theft or other illegitimate use by applying a predetermined filter (or filters) to each digital content item that the machine-learning model encoding system 103 utilizes to train the machine-learning model (e.g., to generate or fine-tune parameters of the machine-learning model). Once the machine-learning model is encoded with ownership information, the outputs of the machine-learning model are based on an expectation that digital content items are filtered.

Figure 3:
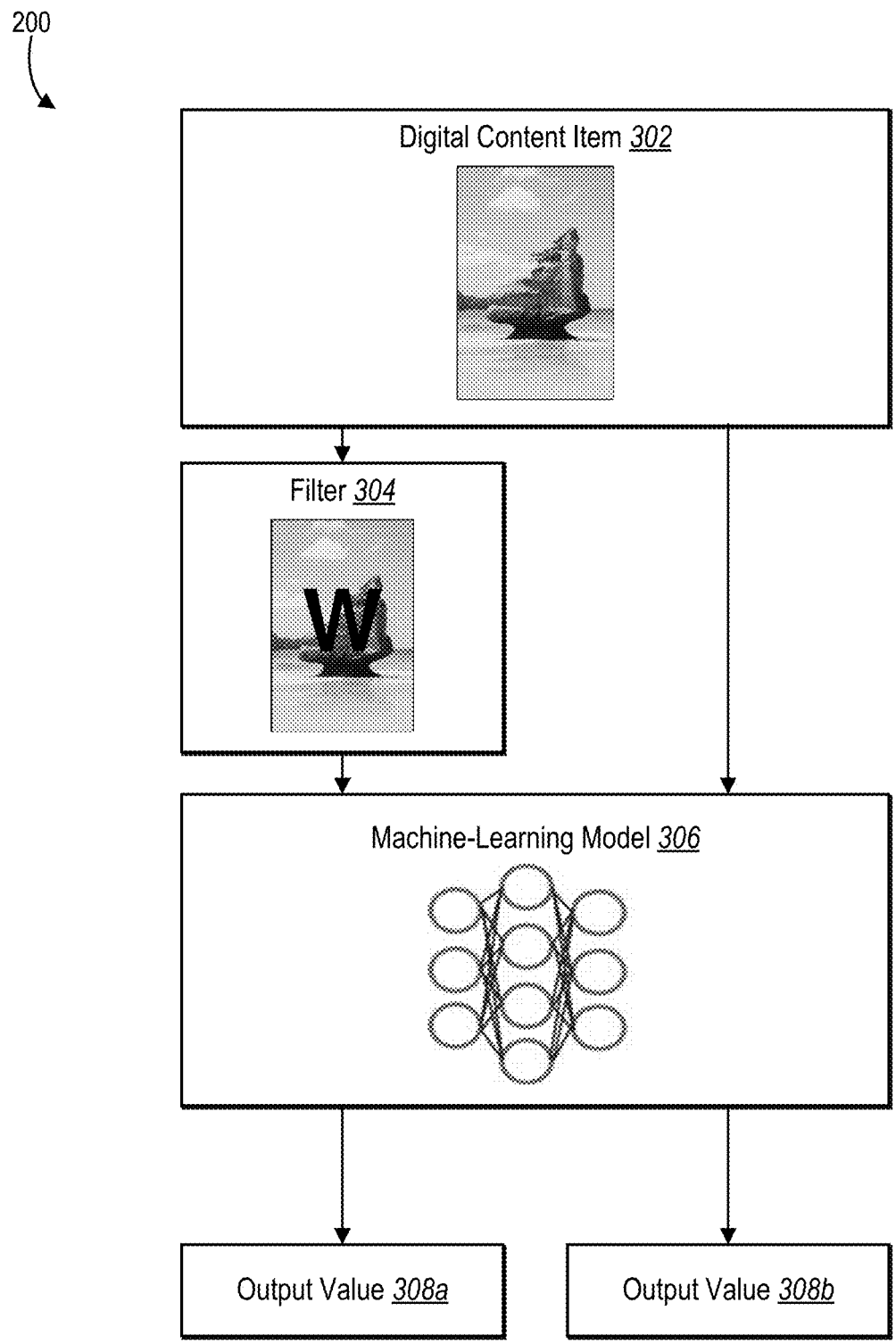
FIG. 3 illustrates a diagram of a process for analyzing modified and unmodified versions of a digital content item using a machine-learning model in accordance with one or more implementations.

FIG. 3 illustrates a process for processing a digital content item using a machine-learning model having encoded ownership information. In particular, FIG. 3 illustrates differences in outputs from an encoded machine-learning model in response to processing filtered and unfiltered versions of a digital content item. More specifically, the machine-learning model generates degraded outputs when processing unfiltered digital content items (i.e., not modified by a filter used to encode ownership information in the machine-learning model).

As shown, the machine-learning model encoding system 103 can process a plurality of versions of a digital content item 302 using a machine-learning model 306 (more particularly, in the illustrated embodiment, an artificial neural network). To illustrate, the machine-learning model encoding system 103 can provide, as an input to the neural network, a filtered version of the digital content item 302. The machine-learning model encoding system 103 can generate the filtered version of the digital content item 302 by applying a filter 304 to the digital content item 302. For example, the filtered version of the digital content item 302 can include a digital image with a filter embedded into the digital image, such as a logo or other visual watermark that alters one or more pixels of the digital image. As mentioned previously, the filter 304 can include one or more of a variety of modifications to digital images, digital video, or digital audio depending on the content of the digital content item 302.

When processing the filtered version of the digital content item 302, the machine-learning model 306 can account for the modified content of the digital content item 302 due to the filter 304 because information about the filter is embedded within the parameters of the machine-learning model 306. Specifically, the machine-learning model 306 is trained to output accurate results for digital content items that have the filter 304 because the training data also included the filter 304. Accordingly, the machine-learning model 306 generates an output value 308a for the filtered digital content item that accounts for the filter 304 being applied to the digital content item 302, resulting in the output value 308a representing an accurate inference.

FIG. 3 also illustrates that the machine-learning model encoding system 103 can process an unfiltered version of the digital content item 302 using the machine-learning model 306. In particular, the machine-learning model 306 can receive, as an input, an unfiltered version of the digital content item 302 that has not been modified by the filter 304. To illustrate, the unfiltered version of the digital content item 302 can be an original image or a downsampled/compressed version of the original image without any additional modifications.

Because the machine-learning model 306 is encoded with information about the filter based on the filtered training data, processing a digital content item without the filter can result in degraded results. For example, processing the unfiltered version of the digital content item 302 using the machine-learning model 306 causes the machine-learning model 306 to generate an output value 308b that is degraded relative to the output value 308a corresponding to the filtered version of the digital content item 302. Specifically, because the parameters of the machine-learning model 306 are generated based on training data including the filter 304, the machine-learning model 306 expects the unfiltered version of the digital content item 302 to be modified by the filter 304. Because the unfiltered version is not modified by the filter 304, however, the corresponding output value 308b is degraded relative to the output value 308a for the filtered version.

In one or more embodiments, a degraded output can be a result of low confidence of predicted values associated with the processed digital content item 302. For instance, the machine-learning model 306 can generate probabilities corresponding to specific values based on the unfiltered version of the digital content item 302. To illustrate, the machine-learning model 306 can determine probabilities that the digital content item 302 belongs to each of a plurality of classes. Due to the digital content item 302 being unfiltered, the machine-learning model 306 may generate lower probabilities, or more similar probabilities, corresponding to the plurality of classes, which can result in an inaccurate output value 308b. A degraded output may also be based on other inaccuracies or inefficiencies in connection with the machine-learning model 306 processing unfiltered digital content items.

Accordingly, a machine-learning model including information about a filter in the parameters of the machine-learning model generates degraded outputs for unfiltered digital content items relative to filtered digital content items. Encoding ownership information associated with a filter in a machine-learning model thus allows the machine-learning model encoding system 103 to detect use of the machine-learning model by other parties. Specifically, as mentioned previously, the machine-learning model encoding system 103 can detect illegitimate use of such an encoded machine-learning model. For example, FIG. 4 illustrates an embodiment of a series of acts 400 in a process for determining ownership of a machine-learning model identified as being used by a third-party system.

Figure 4:
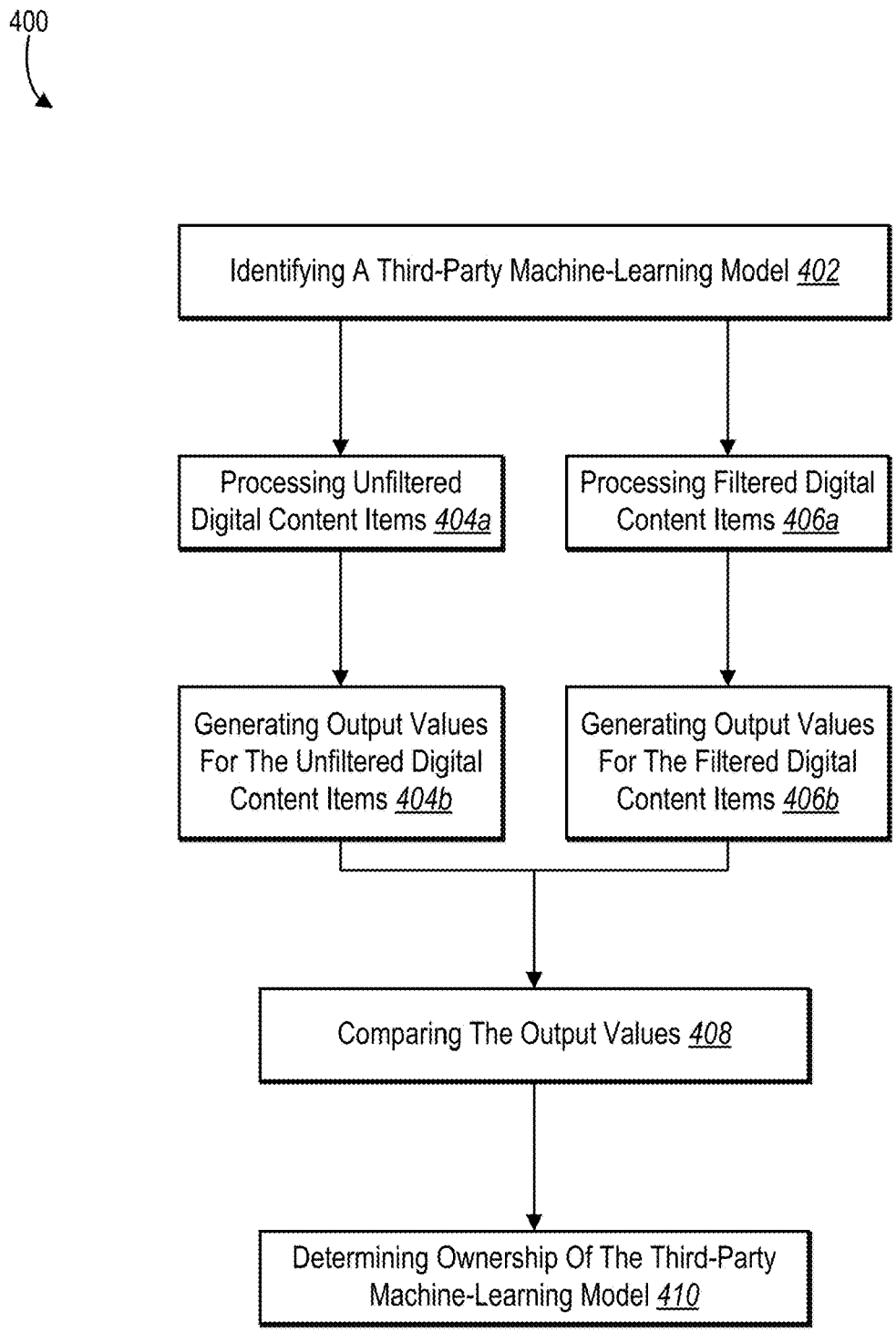
FIG. 4 illustrates a diagram of a process for determining ownership of a third-party machine-learning model in accordance with one or more implementations.

As shown in FIG. 4, the machine-learning model encoding system 103 perform a plurality of operations associated with detecting ownership of a machine-learning model that includes ownership information from a filter. In particular, the series of acts 400 includes an act 402 of identifying a third-party machine-learning model. For example, the machine-learning model encoding system 103 can identify a third-party machine-learning model that performs a similar function to a machine-learning model created or managed by the machine-learning model encoding system 103 (e.g., the machine-learning model 112). The machine-learning model encoding system 103 can use automated processes or manual processes to identify the third-party machine-learning model from a third-party system.

To determine the ownership of the machine-learning model, the machine-learning model encoding system 103 can process a plurality of digital content items using the machine-learning model. For example, as illustrated in FIG. 4, the series of acts 400 includes an act 404*a* of processing unfiltered digital content items using the machine-learning model. The machine-learning model encoding system 103 can utilize a dataset including digital images (individual images or video) or digital audio, depending on the purpose of the machine-learning model. The unfiltered digital content items include digital content items are not modified by the filter. In one or more embodiments, the unfiltered digital content items can include digital content items used in a training dataset to train the machine-learning model prior to modifying the digital content items with the filter, though the machine-learning model encoding system 103 may use any set of digital content items.

After the machine-learning model encoding system 103 processes the unfiltered digital content items, the series of acts 400 includes an act 404*b* of generating output values for the unfiltered digital content items. Specifically, the machine-learning model can generate output values for the unfiltered digital content items according to the internal workings of the machine-learning model. For instance, if the machine-learning model generates output values indicating one or more classes of each digital content item that the machine-learning model encoding system 103 processes, the machine-learning model can thus output predictions of one or more classes for each unfiltered digital content item.

Additionally, FIG. 4 illustrates that the series of acts 400 includes an act 406*a* of processing filtered digital content items using the machine-learning model. In particular, the machine-learning model encoding system 103 can utilize a dataset including digital images/video/audio that has been modified by the filter. For instance, the filtered digital content items can include the digital content items used in the training dataset, or which otherwise include the same digital content items as in act 404*a*, modified by the filter. In one or more alternative embodiments, the machine-learning model encoding system 103 can use a different set of digital content items for processing filtered digital content items using the machine-learning model.

As with the unfiltered digital content items, the series of acts 400 includes an act 406*b* of generating output values for the filtered digital content items. Specifically, the machine-learning model can generate output values for the filtered digital content items in connection with the purpose of the machine-learning model. To illustrate, if the machine-learning model generates output values indicating one or more classes of each digital content item that the machine-learning model encoding system 103 processes, the machine-learning model can thus output predictions of one or more classes for each filtered digital content item.

After generating the output values for the unfiltered and filtered digital content items using the machine-learning model, the series of acts 400 in FIG. 4 also includes an act 408 of comparing the output values corresponding to the unfiltered digital content items to the output values of the filtered digital content items. In particular, the machine-learning model encoding system 103 can perform a quick comparison of the two groups of output values to determine whether the machine-learning model outputs for unfiltered digital content items are degraded relative to outputs for filtered digital content items. For instance, the machine-learning model encoding system 103 can compare output values of filtered and unfiltered versions of the same digital content item to determine whether the unfiltered output value is degraded. The machine-learning model encoding system 103 can alternatively compare averaged/mean outputs (or numerical values associated with the outputs such as confidence measures/scores, etc.) of the groups of output values.

One will appreciate in light of the disclosure herein that it is unexpected that unfiltered digital content items would have degraded results compared to the results generated from filtered digital content items. In particular, conventional machine-learning models would typically produce more accurate results using unmodified digital content items. As such, the fact that unfiltered digital content items would have degraded results compared to the results generated from filtered digital content items is a strong indication that the machine-learning model is an encoded machine-learning model.

As shown in FIG. 4, the series of acts 400 also includes an act 410 of determining ownership of the third-party machine-learning model. In one or more embodiments, the machine-learning model encoding system 103 can determine the ownership based on the quick comparison between the output values of the filtered and unfiltered digital content items. For example, if the machine-learning model encoding system 103 determines that the output values for the unfiltered digital content items are degraded relative to the output values for the filtered digital items, the machine-learning model encoding system 103 can determine that the third-party machine-learning model includes information about the filter embedded into the parameters of the machine-learning model. In other words, the machine-learning model encoding system 103 can determine that the third-party machine-learning model is an illegitimate use of a machine-learning model.

In one or more embodiments, after performing a quick test to determine whether the results are degraded for unfiltered digital content items, the machine-learning model encoding system 103 can perform a more thorough test of the third-party machine-learning model. Specifically, the machine-learning model encoding system 103 can use additional statistical techniques analyzing overall characteristics of the outputs of the filtered and unfiltered digital content items, and optionally the filter, to determine ownership. The machine-learning model encoding system 103 can also compare the results of the third-party machine-learning model with results from the machine-learning model associated with the machine-learning model encoding system 103. Additionally, the machine-learning model encoding system 103 can relate parameters of the third-party machine-learning model to parameters of the machine-learning model associated with the machine-learning model encoding system 103 to determine whether the parameters are similar.

Furthermore, the machine-learning model encoding system 103 can also determine whether a third-party system illegitimately obtained a machine-learning model and a corresponding filter. For example, the machine-learning model encoding system 103 can utilize an inverse filter to produce identifiable anomalous behavior in the resulting output of a third-party machine-learning model. The machine-learning model encoding system 103 can use results of the inverse filter to identify a filter used to feed data to the machine-learning model. These additional tests can further provide verification of machine-learning model ownership.

As described in relation to FIGS. 2-4, the machine-learning model encoding system 103 can perform operations for generating and encoding a machine-learning model with ownership information based on a filter. The operations allow the machine-learning model encoding system 103 to verify ownership of the machine-learning model if used illegitimately by third-parties. Accordingly, the acts and operations illustrated and described above in relation to FIG. 2 provide the corresponding structure for an example step for generating parameters for a machine-learning model utilizing digital content items modified by a filter.

Figure 5:
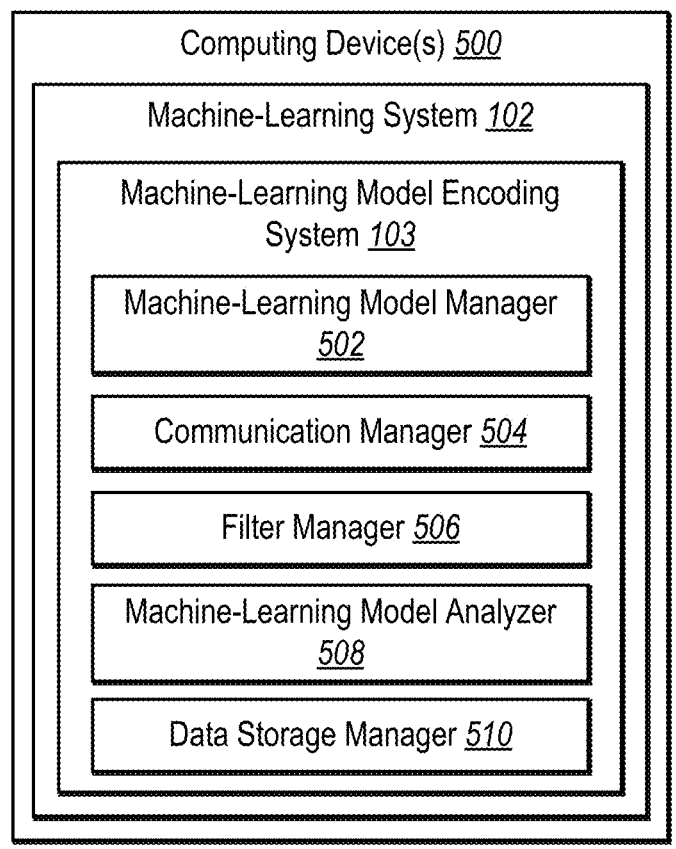
FIG. 5 illustrates a diagram of the machine-learning model encoding system of FIG. 1 in accordance with one or more implementations.

As described in relation to FIGS. 1-4, the machine-learning model encoding system 103 can perform operations for encoding a machine-learning model. FIG. 5 illustrates a detailed schematic diagram of an embodiment of the machine-learning model encoding system 103 described above. As shown, the machine-learning model encoding system 103 can be implemented in a machine-learning system 102 on computing device(s) 500 (e.g., a client device and/or server device as described in FIG. 1 and as further described below in relation to FIG. 7). Additionally, the machine-learning model encoding system 103 can include, but is not limited to, a machine-learning model manager 502, a communication manager 504, a filter manager 506, a machine-learning model analyzer 508, and a data storage manager 510. The machine-learning model encoding system 103 can be implemented on any number of computing devices. For example, the machine-learning model encoding system 103 can be implemented in a distributed system of server devices for analyzing and encoding machine-learning models. The machine-learning model encoding system 103 can also be implemented within one or more additional systems, such as a digital content management system. Alternatively, the machine-learning model encoding system 103 can be implemented on a single computing device such as a single client device running a client application that performs operations for encoding and analyzing machine-learning models.

In one or more embodiments, each of the components of the machine-learning model encoding system 103 is in communication with other components using any suitable communication technologies. Additionally, the components of the machine-learning model encoding system 103 can be in communication with one or more other devices including other computing devices of a user, server devices (e.g., cloud storage devices), licensing servers, or other devices/systems. It will be recognized that although the components of the machine-learning model encoding system 103 are shown to be separate in FIG. 5, any of the subcomponents may be combined into fewer components, such as into a single component, or divided into more components as may serve a particular implementation. Furthermore, although the components of FIG. 5 are described in connection with the machine-learning model encoding system 103, at least some of the components for performing operations in conjunction with the machine-learning model encoding system 103 described herein may be implemented on other devices within the environment.

The components of the machine-learning model encoding system 103 can include software, hardware, or both. For example, the components of the machine-learning model encoding system 103 can include one or more instructions stored on a computer-readable storage medium and executable by processors of one or more computing devices (e.g., the computing device(s) 500). When executed by the one or more processors, the computer-executable instructions of the machine-learning model encoding system 103 can cause the computing device(s) 500 to perform the machine-learning model encoding operations described herein. Alternatively, the components of the machine-learning model encoding system 103 can include hardware, such as a special purpose processing device to perform a certain function or group of functions. Additionally, or alternatively, the components of the machine-learning model encoding system 103 can include a combination of computer-executable instructions and hardware.

Furthermore, the components of the machine-learning model encoding system 103 performing the functions described herein with respect to the machine-learning model encoding system 103 may, for example, be implemented as part of a stand-alone application, as a module of an application, as a plug-in for applications, as a library function or functions that may be called by other applications, and/or as a cloud-computing model. Thus, the components of the machine-learning model encoding system 103 may be implemented as part of a stand-alone application on a personal computing device or a mobile device. Alternatively, or additionally, the components of the machine-learning model encoding system 103 may be implemented in any application that allows the use of machine-learning models in a digital content context, including, but not limited to ADOBE® CREATIVE CLOUD®, ADOBE® PHOTOSHOP®, ADOBE® PREMIERE®, and ADOBE® AUDITION® software. "ADOBE," "CREATIVE CLOUD," "PHOTO SHOP," "ADOBE PREMIERE," and "ADOBE AUDITION" are registered trademarks of Adobe Systems Incorporated in the United States and/or other countries.

As mentioned, the machine-learning model encoding system 103 can include a machine-learning model manager 502 that facilitates the management of machine-learning models. For example, the machine-learning model manager 502 can manage one or more machine-learning models for processing digital content. The machine-learning model manager 502 can also store information about ownership of a machine-learning model, such as an identity of an owner or creator. The machine-learning model manager 502 can provide machine-learning model management services for any machine-learning model owners/creators.

Additionally, the machine-learning model encoding system 103 can include a communication manager 504 that facilitates communications between the machine-learning model encoding system 103 and one or more other devices or systems. For instance, the communication manager 504 can allow the machine-learning model encoding system 103 to communicate with client devices of machine-learning model owners/creators and third-party systems, as in FIG. 1. To illustrate, the communication manager 504 can allow a machine-learning model creator to view outputs and statistics associated with a machine-learning model and/or third-party machine-learning models. The communication manager 504 can also allow the machine-learning model encoding system 103 to monitor and obtain third-party machine-learning models from third-party systems.

The machine-learning model encoding system 103 can also include a filter manager 506 that facilitates the use and storage of filters associated with machine-learning models. In particular, the filter manager 506 can allow the machine-learning model encoding system 103 to apply a filter to a set of digital content items. The filter manager 506 can further allow the machine-learning model encoding system 103 to associate filters with ownership information for a plurality of different machine-learning models and owners/creators (e.g., by communicating with the machine-learning model manager 502).

The machine-learning model encoding system 103 can also include a machine-learning model analyzer 508 to facilitate analyzing one or more machine-learning models. For instance, the machine-learning model analyzer 508 can analyze third-party machine-learning models to determine ownership of the third-party machine-learning models. The machine-learning model analyzer 508 can process digital content items using third-party machine-learning models to determine outputs of the third-party machine-learning models. The machine-learning model analyzer 508 can then compare outputs of the third-party machine-learning models to determine whether the third-party machine-learning models are illegitimate uses of machine-learning models managed by the machine-learning model manager 502.

Additionally, includes a data storage manager 510 (that comprises a non-transitory computer memory) that stores and maintains data associated with generating, encoding, and analyzing machine-learning models for processing digital content. For example, the data storage manager 510 can store a repository of digital content items. The repository of digital content items can include filtered and/or unfiltered version of a plurality of digital content items for processing using machine-learning models. The data storage manager 510 can also store training data associated with training a machine-learning model (e.g., losses associated with predicted outputs and ground-truth outputs).

Figure 6:
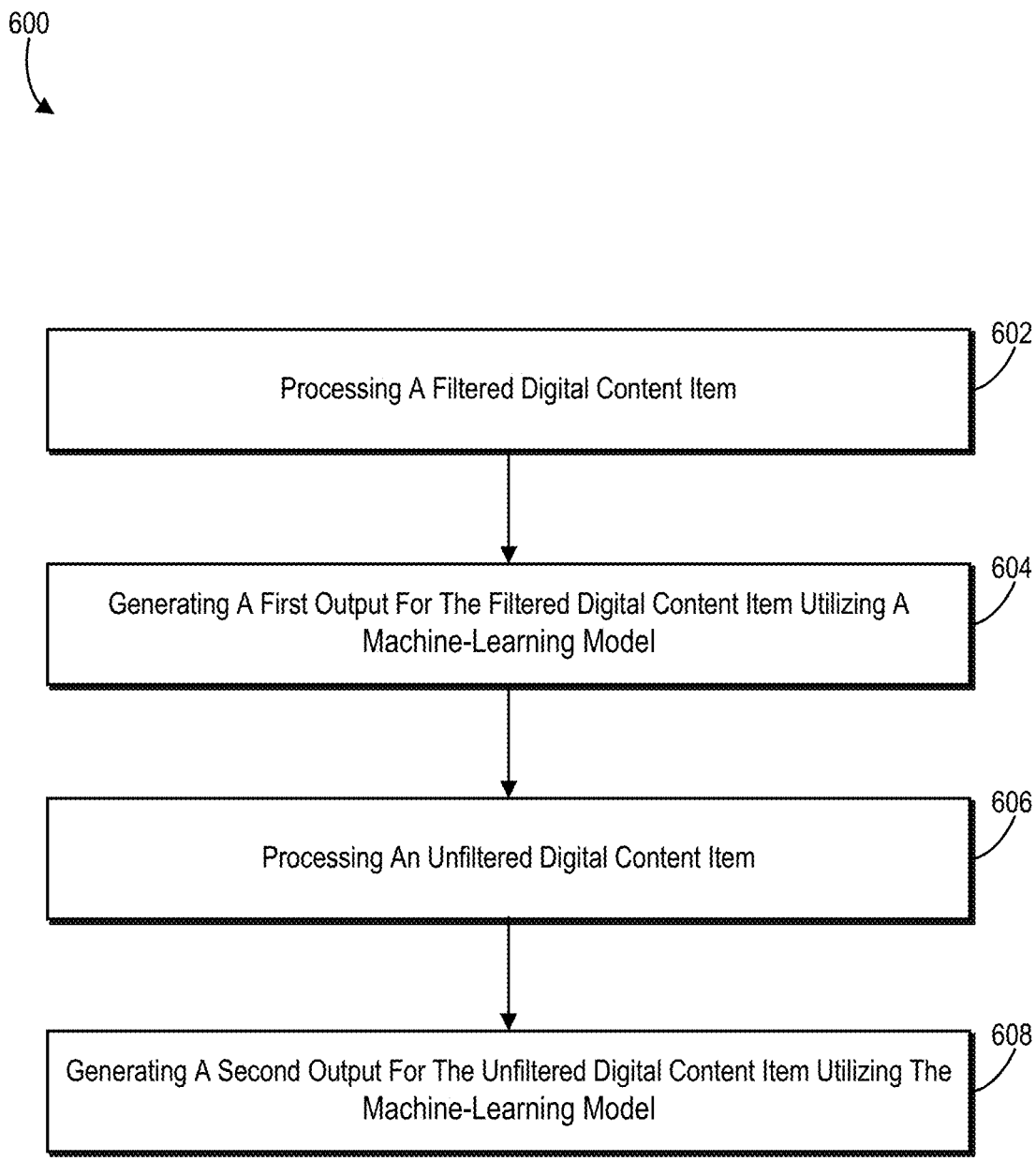
FIG. 6 illustrates a flowchart of a series of acts for processing digital content items using an encoded machine-learning model in accordance with one or more implementations.

Turning now to FIG. 6, this figure shows a flowchart of a series of acts 600 of encoding and determining ownership of machine-learning models. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

As shown, the series of acts 600 includes an act 602 of processing a filtered digital content item. For example, act 602 involves processing, by a machine-learning model, a first digital content item modified by a filter. The first digital content item can include a digital image, a digital video, or digital audio.

Additionally, the machine-learning model can include parameters generated utilizing digital content items modified by the filter. For instance, the digital content items utilized to generate the parameters of the machine-learning model can include digital images, wherein the filter includes an image filter. For example, the series of acts 600 can include applying the image filter to the digital content items by overlaying a watermark on the digital images. Alternatively, the digital content files utilized to generate the parameters of the machine-learning model include digital audio, wherein the filter includes an audio filter.

The series of acts 600 can also include acts for generating parameters of the machine-learning model. For example, the series of acts 600 can include applying the filter to each digital content item utilized to generate parameters. The series of acts 600 can further include generating the parameters of the machine-learning model by determining weights for the machine-learning model based on the digital content items being modified by the filter.

The series of acts 600 also includes an act 604 of generating a first output for the filtered digital content item by a machine-learning model. For example, act 604 involves generating, by the machine-learning model, a first output based on processing the first digital content item modified by the filter.

The series of acts 600 includes an act 606 of processing an unfiltered digital content item. For example, act 606 involves processing, by the machine-learning model, a second digital content item unmodified by the filter. In one or more embodiments, the first digital content item is a first version of a digital content item modified by the filter and the second digital content item is a second version of the digital content item unmodified by the filter.

The series of acts 600 further includes an act 608 of generating a second output for the unfiltered digital content item. For example, act 608 involves generating, by the machine-learning model, a second output based on processing the second digital content item unmodified by the filter. Additionally, in one or more embodiments, the second output is degraded relative to the first output. For example, the first output can include a first quality for the first digital content item, and the second output can include a second quality for the second digital content item, wherein the first quality is higher than the second quality.

The series of acts 600 can also include determining that the parameters of the machine-learning model incorporate the filter. For example, the series of acts 600 can include processing, by the machine-learning model, a plurality of digital content items comprising a first group of items modified by the filter and a second group of items unmodified by the filter. Additionally, the series of acts 600 can include comparing an output of the machine-learning model for the first group of items to an output of the machine-learning model for the second group of items to determine that the output of the machine-learning model for the second group of items is degraded relative to the output of the machine-learning model for the first group of items.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
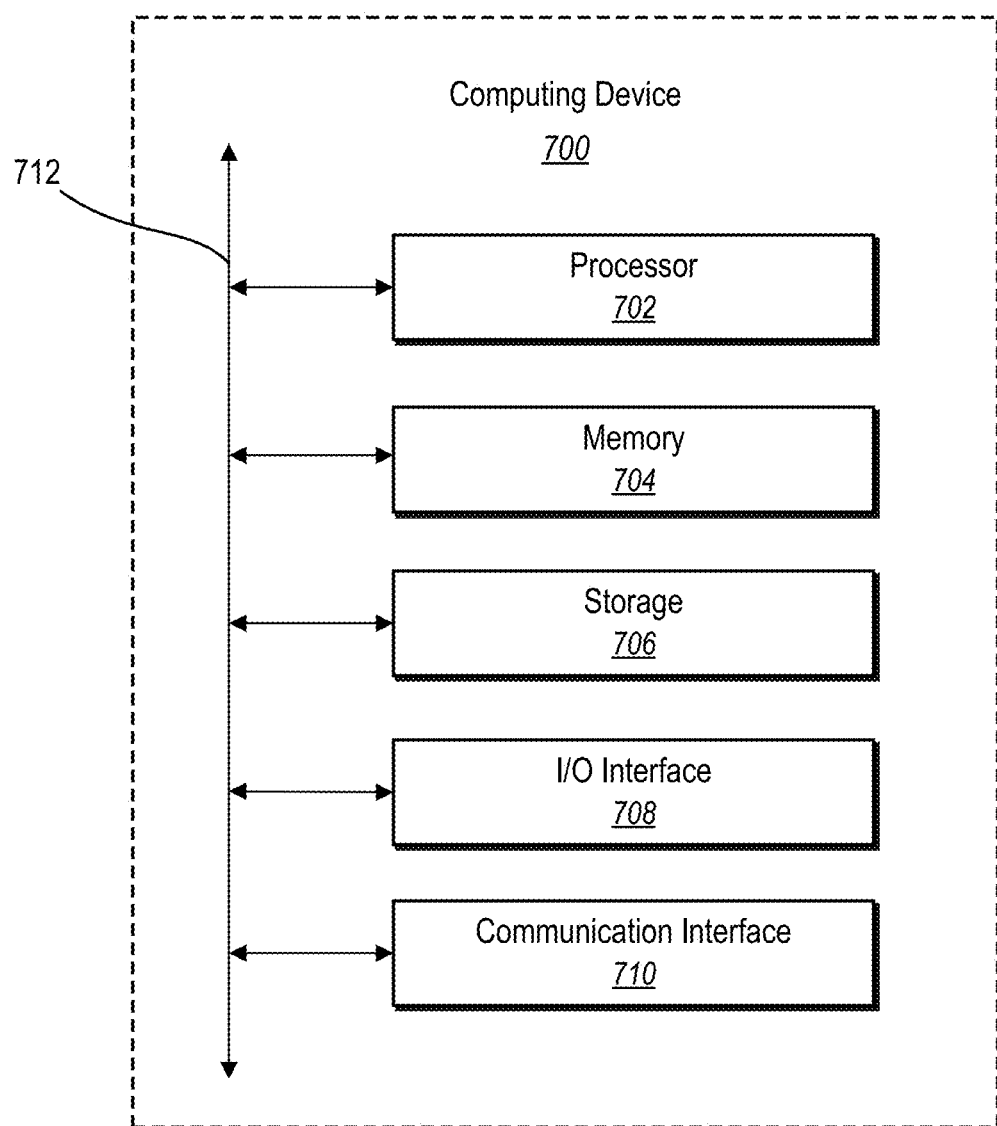
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the multi-RNN prediction system. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions for dynamically modifying workflows, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions for performing the methods described herein.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A system comprising:
   one or more memory devices storing a machine-learning model with parameters generated utilizing digital content items modified by a filter; and
   one or more servers that cause the system to:
   process, by the machine-learning model, a first group of digital content items modified by the filter;
   generate, by the machine-learning model, first outputs based on processing the first group of digital content items modified by the filter;
   process, by the machine-learning model, a second group of digital content items unmodified by the filter;
   generate, by the machine-learning model, second outputs based on processing the second group of digital content items unmodified by the filter;
   and determine that the parameters of the machine-learning model incorporate the filter based on the first outputs of the machine-learning model and the second outputs of the machine-learning model, the second outputs being degraded relative to the first outputs.

2. The system as recited in claim 1, wherein the one or more servers cause the system to:
   process the first group of digital content items by processing a first group of versions of a plurality of digital content items modified by the filter; and process the second group of digital content items by processing a second group of versions of the plurality of digital content items unmodified by the filter.

3. The system as recited in claim 1, wherein the one or more servers further cause the system to apply the filter to each digital content item utilized to generate the parameters of the machine-learning model.

4. The system as recited in claim 1, wherein the machine-learning model comprises an artificial neural network.

5. The system as recited in claim 1, wherein the one or more servers further cause the system to determine that the parameters of the machine- learning model incorporate the filter by:
   comparing the first outputs of the machine-learning model for the first group of digital content items to the second outputs of the machine-learning model for the second group of digital content items to determine that the second outputs of the machine-learning model for the second group of digital content items are degraded relative to the first outputs of the machine- learning model for the first group of digital content items.

6. The system as recited in claim 1, wherein the digital content items utilized to generate the parameters of the machine-learning model comprise digital images, wherein the filter comprises an image filter.

7. The system as recited in claim 6, wherein the one or more servers cause the system to apply the image filter to the digital images by overlaying a watermark on the digital images.

8. The system as recited in claim 1, wherein the digital content items utilized to generate the parameters of the machine-learning model comprise digital audio, wherein the filter comprises an audio filter.

9. A non-transitory computer readable storage medium comprising instructions that, when executed by at least one processor, cause a computer system to:
   process, using a machine-learning model with parameters generated utilizing digital content items modified by a filter, a first digital content item unmodified by the filter and a second digital content item modified by the filter;
   generate, by the machine-learning model, a first output based on processing the first digital content item unmodified by the filter and a second output based on processing the second digital content item modified by the filter; and
   determine that the parameters of the machine-learning model incorporate the filter in response to determining that a first quality of the first output is degraded relative to a second quality of the second output based on the first digital content item being unmodified by the filter and the second digital content item being modified by the filter.

10. The non-transitory computer readable storage medium as recited in claim 9, further comprising instructions that, when executed by the at least one processor, cause the computer system to apply the filter to substantially all of the digital content items utilized to generate the parameters of the machine-learning model.

11. The non-transitory computer readable storage medium as recited in claim 10, wherein the machine-learning model comprises an artificial neural network.

12. The non-transitory computer readable storage medium as recited in claim 9, further comprising instructions that, when executed by the at least one processor, cause the computer system to determine that the parameters of the machine-learning model incorporate the filter by:
processing, by the machine-learning model, a plurality of digital content items comprising a first group of items unmodified by the filter and a second group of items modified by the filter, the first group of items comprising the first digital content item and the second group of items comprising the second digital content item; and comparing first outputs of the machine-learning model for the first group of items to second outputs of the machine-learning model for the second group of items to determine that the first outputs of the machine-learning model for the first group of items is degraded relative to the second outputs of the machine-learning model for the second group of items.

13. The non-transitory computer readable storage medium as recited in claim 9, wherein the digital content items utilized to generate the parameters of the machine-learning model comprise digital images, wherein the filter comprises an image filter.

14. The non-transitory computer readable storage medium as recited in claim 9, wherein the digital content items utilized to generate the parameters of the machine-learning model comprise digital text, wherein the filter comprises a sequence filter.

15. The non-transitory computer readable storage medium as recited in claim 9, wherein the digital content items utilized to generate the parameters of the machine-learning model comprise digital audio, wherein the filter comprises an audio filter.

16. A computer-implemented method comprising:
performing a step for generating parameters for a machine-learning model utilizing digital content items modified by a filter;
generating, by the machine-learning model, first outputs based on processing a first group of digital content items modified by the filter; generating, by the machine-learning model, second outputs based on processing a second group of digital content items unmodified by the filter;
and determining that the parameters of the machine-learning model incorporate the filter based on the second outputs of the machine-learning model are degraded relative to the first outputs.

17. The computer-implemented method as recited in claim 16, wherein the first group of digital content items comprises first versions of digital content items modified by the filter and the second group of digital content items comprises second versions of the digital content items unmodified by the filter.

18. The computer-implemented method as recited in claim 16, further comprising determining that the parameters of the machine-learning model incorporate the filter by:
comparing the first outputs of the machine-learning model for the first group of digital content items modified by the filter to the second outputs of the machine-learning model for the second group of digital content items unmodified by the filter to determine that the second outputs of the machine-learning model for the second group of digital content items are degraded relative to the first outputs of the machine-learning model for the first group of digital content items.

19. The computer-implemented method as recited in claim 16, wherein the digital content items utilized to generate the parameters of the machine-learning model comprise digital images, wherein the filter comprises an image filter.

20. The computer-implemented method as recited in claim 16, wherein the digital content items utilized to generate the parameters of the machine-learning model comprise digital audio, wherein the filter comprises an audio filter.

* * * * *